US012664292B2

(12) United States Patent
Majdabadi et al.

(10) Patent No.: US 12,664,292 B2
(45) Date of Patent: Jun. 23, 2026

(54) ROBOTIC PROCESS AUTOMATION DRIVEN CONDITIONAL FORMATTING RULES FOR USER INTERFACES

(71) Applicant: INTERNATIONAL BUSINESS MACHINES CORPORATION, Armonk, NY (US)

(72) Inventors: Hamid Majdabadi, Ottawa (CA); Su Liu, Austin, TX (US); Jeremy R. Fox, Georgetown, TX (US); Neil Delima, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 18/648,300

(22) Filed: Apr. 26, 2024

(65) Prior Publication Data

US 2025/0335610 A1     Oct. 30, 2025

(51) Int. Cl.
*G06F 21/60*          (2013.01)
*G06F 11/34*          (2006.01)

(52) U.S. Cl.
CPC ........ *G06F 21/604* (2013.01); *G06F 11/3438* (2013.01); *G06F 2221/2141* (2013.01)

(58) Field of Classification Search
CPC ............... G06F 21/604; G06F 11/3438; G06F 2221/2141; G06F 21/60; G06F 11/33
See application file for complete search history.

(56) References Cited

U.S. PATENT DOCUMENTS 6,640,234  B1     10/2003  Coffen
7,933,862  B2     4/2011   Chamberlain et al.
                  (Continued)

FOREIGN PATENT DOCUMENTS

CN          1755599  B      6/2010
CN          117172684  A    12/2023
                  (Continued)

OTHER PUBLICATIONS

Lightfoot, L. "The Top 10 Business Intelligence (BI) Tools", downloaded Jan. 16, 2024 from https://expertinsights.com/insights/the-top-10-business-intelligence-bi-tools/, 9 pgs.
                  (Continued)

*Primary Examiner* — Amir Mehrmanesh
*Assistant Examiner* — Aayush Aryal
(74) *Attorney, Agent, or Firm* — CHIP LAW GROUP

(57)          ABSTRACT

Automated conditional formatting of a user interface includes a robotic process automation (RPA) agent receiving user activity via a dashboard user interface. The RPA agent automatically determines data engaged by a user from data associated with the user activity. A role of the user during an engagement with the dashboard user interface is identified. The RPA agent identifies data segments of interest. The data segments of interest and the identified role of the user are forwarded to a machine learning module. Upon receiving, via the dashboard user interface, a notification of an opening of the dashboard user interface, the machine learning module predicts a set of data segments in the dashboard user interface that will be of interest to the user. The predicted set of data segments are sent to the RPA agent. The RPA agent applies conditional formatting rules to the display of predicted set of data segments.

17 Claims, 5 Drawing Sheets

(56)                References Cited

U.S. PATENT DOCUMENTS

| | | | | |
|---|---|---|---|---|
| 10,095,489 | B1 * | 10/2018 | Lieberman | G06F 9/455 |
| 2019/0332508 | A1 * | 10/2019 | Goyal | G06F 11/3414 |
| 2020/0147791 | A1 * | 5/2020 | Safary | G06N 20/00 |
| 2020/0287992 | A1 * | 9/2020 | Berg | G06F 11/3452 |
| 2021/0303381 | A1 * | 9/2021 | Baldassarre | G06N 5/04 |
| 2021/0379764 | A1 * | 12/2021 | Tai | B25J 9/1689 |
| 2022/0067109 | A1 * | 3/2022 | Mansoor | G06F 16/9538 |
| 2022/0180228 | A1 | 6/2022 | Vigeant | |
| 2022/0215005 | A1 * | 7/2022 | Bidkar | H04L 63/0263 |
| 2023/0009201 | A1 * | 1/2023 | Nott | G06N 20/00 |
| 2023/0215458 | A1 * | 7/2023 | Morgan | G10L 25/27 |
| | | | | 704/270 |
| 2024/0070257 | A1 * | 2/2024 | Paslaru | G06F 21/335 |
| 2024/0142917 | A1 * | 5/2024 | Marin | G06N 3/0442 |
| 2024/0168773 | A1 * | 5/2024 | Marutha Gounder Palanisamy | |
| | | | | G06F 9/54 |
| 2024/0202050 | A1 * | 6/2024 | Munteanu | G06F 11/302 |
| 2024/0311226 | A1 * | 9/2024 | Meenakshisundaram | |
| | | | | G06F 11/079 |
| 2024/0362157 | A1 * | 10/2024 | Kushnir | G06F 11/3409 |
| 2025/0094322 | A1 * | 3/2025 | Weishaar | G06F 11/3466 |

FOREIGN PATENT DOCUMENTS

| | | | |
|---|---|---|---|
| WO | 2007100518 | A1 | 9/2007 |
| WO | 2023211536 | A1 | 11/2023 |

OTHER PUBLICATIONS

Anonymous, "Apply conditional formatting in tables and matrixes", downloaded Jan. 16, 2024 from https://learn.microsoft.com/en-us/power-bi/create-reports/desktop-conditional-table-formatting, 16 pgs.

Gharibshah, Z. et al., "Deep Learning for User Interest and Response Prediction in Online Display Advertising", Data Science and Engineering (2020), vol. 5, pp. 16-26, https://link.springer.com/article/10.1007/s41019-019-00115-y.

IBM Robotic Process Automation Market, downloaded Jan. 16, 2024 https://www.emergenresearch.com/industry-report/robotic-process-automation-market, 7 pgs.

IBM, What is business analytics? downloaded Jan. 16, 2024 from https://www.ibm.com/topics/business-analytics, 14 pgs.

IBM Robotic Process Automation, downloaded Jan. 16, 2024 from https://www.ibm.com/products/robotic-process-automation, 16 pgs.

* cited by examiner

100

| Region | World | | | | | | | |
|---|---|---|---|---|---|---|---|---|
| model | actvsbud | Year | 2 Quarter | Apr | May | Jun | 3 Quarter | 4 Quarter |
| L Series 2WD | Variance | -1439843.35 | 878668.04 | 347131.00 | 283977.22 | 247559.82 | 2280538.16 | -4599049.55 |
| L Series 2WD | Actual | 13301726.35 | 4324592.89 | 1442989.37 | 1445930.63 | 1435672.89 | 7848070.24 | 1129063.22 |
| L Series 2WD | Budget | 14741569.70 | 3445924.85 | 1095858.37 | 1161953.41 | 1188113.07 | 5567532.08 | 5728112.77 |
| L Series 4WD | Variance | 1213056.88 | 545506.46 | 178437.04 | 180923.26 | 186146.16 | 338624.51 | 328925.91 |
| L Series 4WD | Actual | 1570390.21 | 196339.78 | 64270.37 | 65089.92 | 66979.49 | 687624.52 | 686425.91 |
| L Series 4WD | Budget | 357333.33 | -349166.68 | -114166.67 | -115833.34 | -119166.67 | 349000.01 | 357500.00 |
| L Series 1.8 L Wagon 4WD | Variance | 123786.55 | -116223.98 | -38793.05 | -40265.45 | -37165.48 | 118205.78 | 121804.75 |
| L Series 1.8 L Wagon 4WD | Actual | 247119.87 | -244557.32 | -80459.72 | -81932.12 | -82165.48 | 246539.11 | 245138.08 |
| L Series 1.8 L Wagon 4WD | Budget | 123333.32 | -128333.34 | -41666.67 | -41666.67 | -45000.00 | 128333.33 | 123333.33 |
| L Series 2.0 L Wagon 4WD | Variance | 1089270.33 | 661730.44 | 217230.09 | 221188.71 | 223311.64 | 220418.73 | 207121.16 |
| L Series 2.0 L Wagon 4WD | Actual | 1323270.34 | 440897.10 | 144730.09 | 147022.04 | 149144.97 | 441085.41 | 441287.83 |
| L Series 2.0 L Wagon 4WD | Budget | 234000.01 | -220833.34 | -72500.00 | -74166.67 | -74166.67 | 22666.68 | 234166.67 |
| L Series | Variance | -226786.47 | 1424174.50 | 525568.04 | 464900.48 | 433705.98 | 2619162.67 | -4270123.64 |
| L Series | Actual | 14872116.56 | 4520932.67 | 1507259.74 | 1511020.55 | 1502652.38 | 8535694.76 | 1815489.13 |
| L Series | Budget | 15098903.03 | 3096758.17 | 981691.70 | 1046120.07 | 1068946.40 | 5916532.09 | 6085612.77 |
| L Series Sedan | Variance | -18150.42 | -11070.47 | 4532.91 | -11632.58 | -3970.80 | -4821.54 | -2258.41 |
| L Series Sedan | Actual | 10159125.82 | 3390900.20 | 1133129.39 | 1127423.40 | 1130347.41 | 3386418.87 | 3381806.75 |
| L Series Sedan | Budget | 10177276.24 | 3401970.67 | 1128596.48 | 1139055.98 | 1134318.21 | 3391240.41 | 3384065.16 |
| L Series Wagon | Variance | 1797563.79 | -84884.27 | -27973.43 | -24443.60 | -32467.24 | 957945.21 | 924502.85 |
| L Series Wagon | Actual | 2709230.45 | -952384.29 | -316306.77 | -317776.94 | -318300.58 | 1839445.22 | 1822169.52 |
| L Series Wagon | Budget | 911666.66 | -867500.02 | -288333.34 | -293333.34 | -285833.34 | 881500.01 | 897666.67 |
| L Series Convertible | Variance | -2006199.84 | 1520129.24 | 549008.56 | 500976.66 | 470144.02 | 1666039.00 | -5193368.08 |
| L Series Convertible | Actual | 2003760.29 | 2082416.76 | 690437.12 | 701374.09 | 690605.55 | 3309830.67 | -3388487.14 |
| L Series Convertible | Budget | 4009960.13 | 562287.52 | 141428.56 | 200397.43 | 220461.53 | 1643791.67 | 1803880.94 |

ROBOTIC PROCESS AUTOMATION DRIVEN CONDITIONAL FORMATTING RULES FOR USER INTERFACES

BACKGROUND

Technical Field

The present disclosure generally relates to information and communication technology, and more particularly, to robotic process automation driven conditional formatting rules for user interfaces.

Description of the Related Art

Conditional formatting is a feature in business analytics tools that allows users to visualize data in a spreadsheet by highlighting cells with certain colors based on specific conditions. While this feature is useful, it is currently a manual process that requires users to create rules with custom formulas. Integrating IoT or RPA technologies into conditional formatting can create a more efficient and automated solution for business analytics.

Adding conditional styles to a report can help better spot unusual or extraordinary results. If a given condition is true, a conditional style, such as cell shading or font colour, is applied to objects. For instance, you might want to automatically highlight in green and red the organisational departments that meet their budgetary quotas, respectively. Information in your reports can be color-coded using conditional styles to help you identify areas that require attention.

Various conditional styles can be applied to objects. For instance, you can use one style in some cells and a different style for the entire report. The final style on the list is used if numerous styles set the same attribute, such as the font color.

SUMMARY

According to an embodiment of the present disclosure, a computer program product for automated conditional formatting of a user interface is disclosed. The computer program product comprises a computer readable storage medium having program instructions embodied therewith. An execution of the program instructions cause a processor to receive, by a robotic process automation agent (RPA), user activity via a dashboard user interface. The processor automatically determines data engaged by a user from data associated with the user activity. A role of the user during an engagement with the dashboard user interface is identified. The RPA agent identifies one or more data segments of interest from the data engaged by the user. The one or more data segments of interest and the identified role of the user are forwarded to a machine learning module. Upon receiving, via the dashboard user interface, a notification of an opening of the dashboard user interface, the machine learning module predicts a set of data segments in the dashboard user interface that will be of interest to the user. The predicted set of data segments are sent to the RPA agent. The RPA agent applies conditional formatting rules to the predicted set of data segments. The predicted set of data segments are displayed on the dashboard user interface using the applied conditional formatting rules.

According to an embodiment of the present disclosure, a method for automated conditional formatting of user interfaces includes a robotic process automation (RPA) agent receiving user activity via a dashboard user interface. The RPA agent automatically determines data engaged by a user from data associated with the user activity. A role of the user during an engagement with the dashboard user interface is identified. The RPA agent identifies one or more data segments of interest from the data engaged by the user. The one or more data segments of interest and the identified role of the user are forwarded to a machine learning module. Upon receiving, via the dashboard user interface, a notification of an opening of the dashboard user interface, the machine learning module predicts a set of data segments in the dashboard user interface that will be of interest to the user. The predicted set of data segments are sent to the RPA agent. The RPA agent applies conditional formatting rules to the predicted set of data segments. The predicted set of data segments are displayed on the dashboard user interface using the applied conditional formatting rules.

According to an embodiment of the present disclosure, a computing device includes a processor operating a dashboard user interface displaying data. Memory is coupled to the processor. The memory stores instructions causing the processor to perform acts comprising a robotic process automation (RPA) agent receiving user activity via a dashboard user interface. The RPA agent automatically determines data engaged by a user from data associated with the user activity. A role of the user during an engagement with the dashboard user interface is identified. The RPA agent identifies one or more data segments of interest from the data engaged by the user. The one or more data segments of interest and the identified role of the user are forwarded to a machine learning module. Upon receiving, via the dashboard user interface, a notification of an opening of the dashboard user interface, the machine learning module predicts a set of data segments in the dashboard user interface that will be of interest to the user. The predicted set of data segments are sent to the RPA agent. The RPA agent applies conditional formatting rules to the predicted set of data segments. The predicted set of data segments are displayed on the dashboard user interface using the applied conditional formatting rules.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4 is a screenshot of a user interface with a dashboard displaying conditional formatting of data segments, consistent with embodiments.

DETAILED DESCRIPTION

Figure 1:
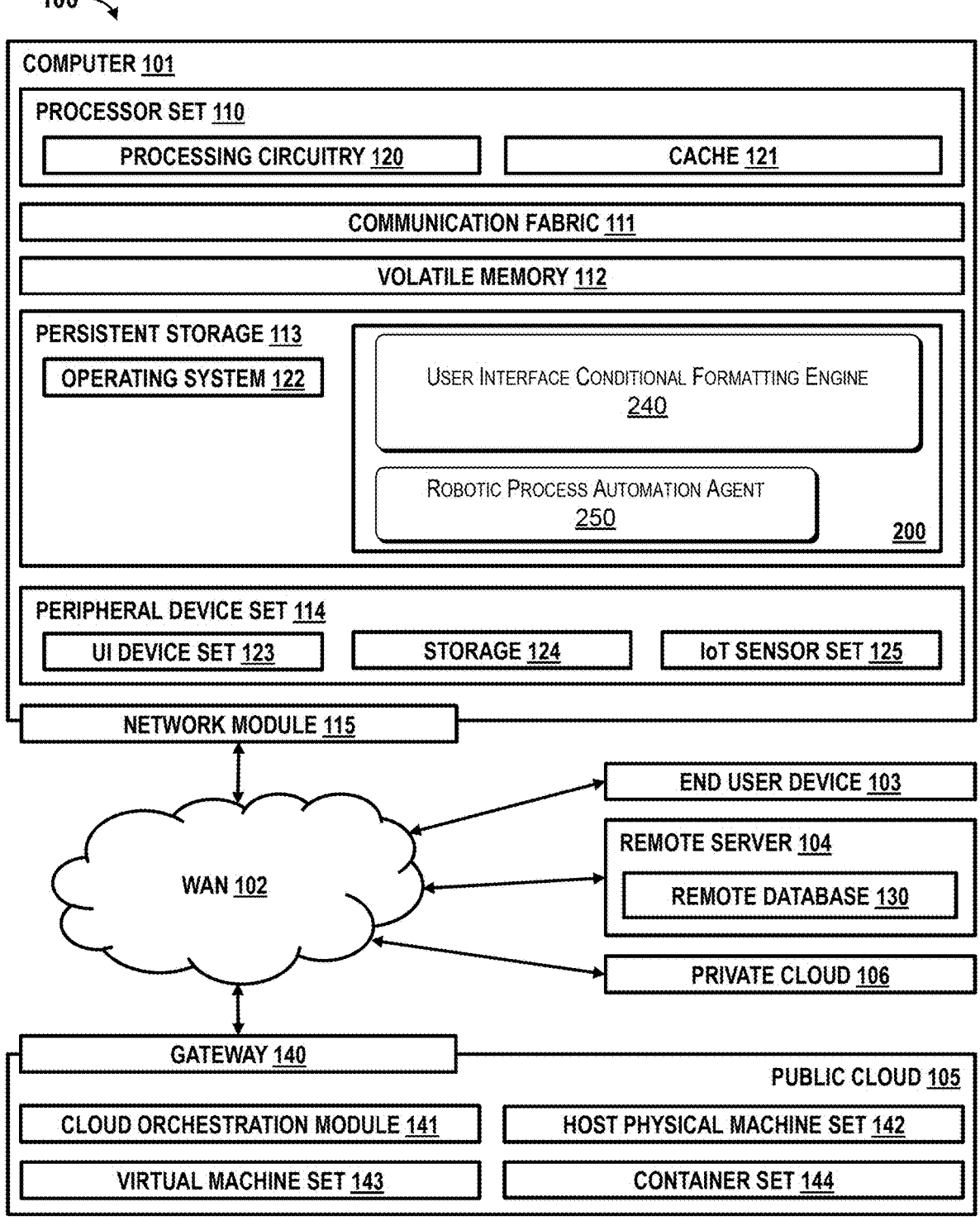
FIG. 1 is a block diagram of a computing environment for automated conditional formatting of user interfaces, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Definitions

Dashboard User Interface, as used herein, refers to a software application that displays an aggregation of data representing performance of a system or entity. Data displayed in the dashboard may be interactive or static.

Data Segment, as used herein, refers to one or more fields, cells, or other user interface presentation object that displays data values.

Robotic Process Automation (RPA), as used herein, refers to automated software application(s) that develop an action list of tasks to be performed by watching a user or other application perform a task. Sometimes that task is observed in an application's graphical user interface (GUI). The RPA then performs automation by repeating the observed tasks.

Agent, as used herein, refers to a software application that operates as an auxiliary program to another host program.

Plug-in, as used herein, refers to a software component that adds a specific feature to an existing computer program.

Module, as used herein, refers to a software application, which may be standalone or may be a hardware component that includes the software application programmed in to memory or a circuit.

Applications integrations module, as used herein, refers to a software module that enables individual applications, each designed for its own specific purpose, to work with one another.

Applications Programming Interface (API), as used herein, refers to an intermediary layer of software that processes data transfers between systems using a set of defined rules that enable different applications to communicate with each other.

Artificial intelligence (A.I), as used herein, refers to computer systems, and sometimes their software, capable of performing complex tasks that historically only a human could do, such as reasoning, making decisions, or solving problems.

Machine Learning, as used herein, refers to a branch of artificial intelligence (A.I.) and computer science that focuses on using data and algorithms to enable A.I. to imitate the way that humans learn, gradually improving its accuracy.

Intent, as used herein, refers to understanding how actions performed by a person's interaction with data may indicate some underlying concept or purpose.

Overview

The present disclosure generally relates to automated conditional formatting of data segments in a user interface. In the field of data analytics, users often engage in dashboard queries for the evaluation of data. Conditional formatting of data is a feature that can provide a crucial view of data for decision-making processes. However, current reporting systems often lack the ability to intelligently, efficiently, and accurately apply smart conditional formatting to displayed datasets. Currently, when users engage a dashboard or other dataset, the users review the data manually and manually highlight data that may be of relevance to their analysis. However, a user does not necessarily forward highlighted data to other users, because different users sharing the same dataset may have differing perspectives on what data affects their decision making. The current manual approach results in time-consuming manual formatting processes and potential inaccuracies in the presentation of data, which can lead to suboptimal decision-making.

The subject technology incorporates the use of robotic process automation (RPA) and machine learning technology to automate the application of repetitive conditional formatting rules in data analytics reporting and visualization. The subject automation allows for the efficient and accurate customization of data visualization, enabling users to quickly identify trends, patterns, and anomalies (e.g., data trends and outliers in deviance) in the presented data. The RPA-driven system also allows for the easy implementation of multilevel conditional formatting rules based on user role and intent to further enhancing the clarity and usefulness of the reports.

Embodiments leverage RPA to develop and maintain well-structured and correctly classified data in enterprise data systems and create data lakes to develop advanced machine learning models for applications. The RPA software robot can operate through one or more software applications like data entry, data migration, and detection of data anomalies, as well as improve data consistency. RPA-generated data helps users gain insight into an organization's processes and workflows, improves modelling processes, and identifies opportunities for specific process improvement. In one aspect, embodiments integrate and leverage RPA into a data analytic feature of conditional formatting for real-time data visualization of data that is relevant to the user's analysis, eliminating the need for a repetitive data modeler and report.

The subject technology may learn from tracking the user's historical engagement with data to predict which data segments in the data set most likely provide the user with data most relevant to the user's analytic intent. In some embodiments, the subject technology learns from a user's previous actions with data segments to predict which data segments will be of interest to a user in a future session with a new data set. Based on predicted future engagement and/or intent, the subject technology may generate quickly visualized conditional formatting that distinguishes data segments relevant to the user from surrounding less relevant data.

In an example scenario, a data modeler may work for a large retail company that has multiple stores across the country. The company has a centralized database that stores information about sales, inventory, and customer data. The data modeler is responsible for generating custom reports for each store manager, which includes information about their store's sales performance, inventory levels, and customer demographics.

To generate these reports, the data modeler manually extracts the relevant data from the database and applies conditional formatting to highlight important trends and insights, per a conventional approach. For example, the data modeler might apply conditional formatting rules to highlight stores that are underperforming in terms of sales or to highlight products that are selling particularly well. The data modeler generates these reports on a regular basis, such as daily, weekly or monthly, and ensures that the reports are accurate and up-to-date for decision making. This conventional approach involves a significant amount of time and effort, as the data modeler has to manually update the reports each time new data is added to the database and re-generate conditional formatting for each party. Furthermore, the data modeler has to maintain these reports over time, which includes updating the conditional formatting rules as needed and ensuring that the reports continue to provide valuable insights for the store managers. This can be a challenging task, as the data modeler may need to balance the needs of multiple stakeholders and ensure that the reports are both accurate and easy to understand.

In comparison, by adopting the subject technology, the data modeler may only need one general report for all stakeholders of all regions. The background process will generate a user interface for each user that will dynamically self-filter in real-time based on conditional formatting rules fed by the respective users' profile, rules and data of interest detected by a machine learning module, which may then be implemented by an RPA agent.

When any one user logs into an analytic platform, they may be assigned to groups with access rights to relevant data set based on their role and authentication. This role information may be used by the machine learning module, which is then coupled with learned user intent, past engagements and past interest. Based on the assigned key performance indicator(s) (KPI) that the user is authorized to see in a data set, the RPA may be triggered by the machine learning module to apply the conditional formatting to data segments predicted to be of interest to the user. In one aspect, the conditional formatting of relevant data may be generated as customized for each individual user (as opposed to the current solution where conditional formatting is entered manually for each individual report and not customized requiring a lot of repetition of entry and data modeler time to do so). By automating conditional formatting tasks, a technical improvement is achieved since the output of the process can automatically provide different highlighted sections of the user interface depending on the user accessing the interface. The automatic highlighting that depends on the user obviates the need for users to review and select data segments manually depending on their respective role in reviewing the data. Accordingly, data modelers can use this technical improvement to save time and improve the accuracy and consistency of their reports, which can ultimately lead to better decisions and improved performance.

As will be appreciated, while many of the elements in the subject technology are software-based, the processes involved provide an improvement to user interfaces using computing technology; namely by automating the discovery of user intent during engagement with datasets and automating the visual presentation of data in the user interface. In addition, the detection features in the subject technology identify engagement with data segments and use artificial intelligence to learn a user's intent from that engagement. The A.I. customizes the visual presentation of data depending on which user is engaging with the dataset. Accordingly, the embodiments herein provide technology that is both useful and an improvement over the state of the art in user interfaces and data presentation.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind when considering that the process analyzes the behavior of multiple users who each have individual thought processes when it comes to analyzing the same data set. It should also be appreciated that the various embodiments of the subject disclosure described herein can include information that is impossible to obtain manually by an entity, such as a human user. For example, the type, amount, and/or variety of information that can be part of the process when performed in an enterprise setting included in performing the process discussed herein can be more complex than information that could be reasonably be processed manually by a human user.

Example Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one or more storage devices that may include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 includes an example of an environment for the execution of at least some of the computer code involved in performing the inventive methods, such as the improved conditional formatting code 200. The improved conditional formatting code 200 may include a user interface conditional formatting engine 240 and a robotic process automation (RPA) agent 250 that cooperate to generate conditional formatting of data segments relevant to a user's analysis, in a user interface. The user interface conditional formatting engine 240 may operate as a backend process that receives data from the RPA agent 250 that is actively monitoring users' activity when engaging with datasets. The user interface conditional formatting engine 240 and/or RPA agent 250 may operate according to one or more of the methods disclosed in further detail below. In addition to conditional formatting code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and conditional formatting code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. For the instant disclosure, the processor set 110 includes for example a central processing unit (CPU) and an accelerator. In some embodiments, a different type of processing element may be used instead of the CPU, (for example, a GPU or other process dedicated/specialized unit). Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in conditional formatting code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in conditional formatting code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertiontype connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example System Architecture

Figure 2:
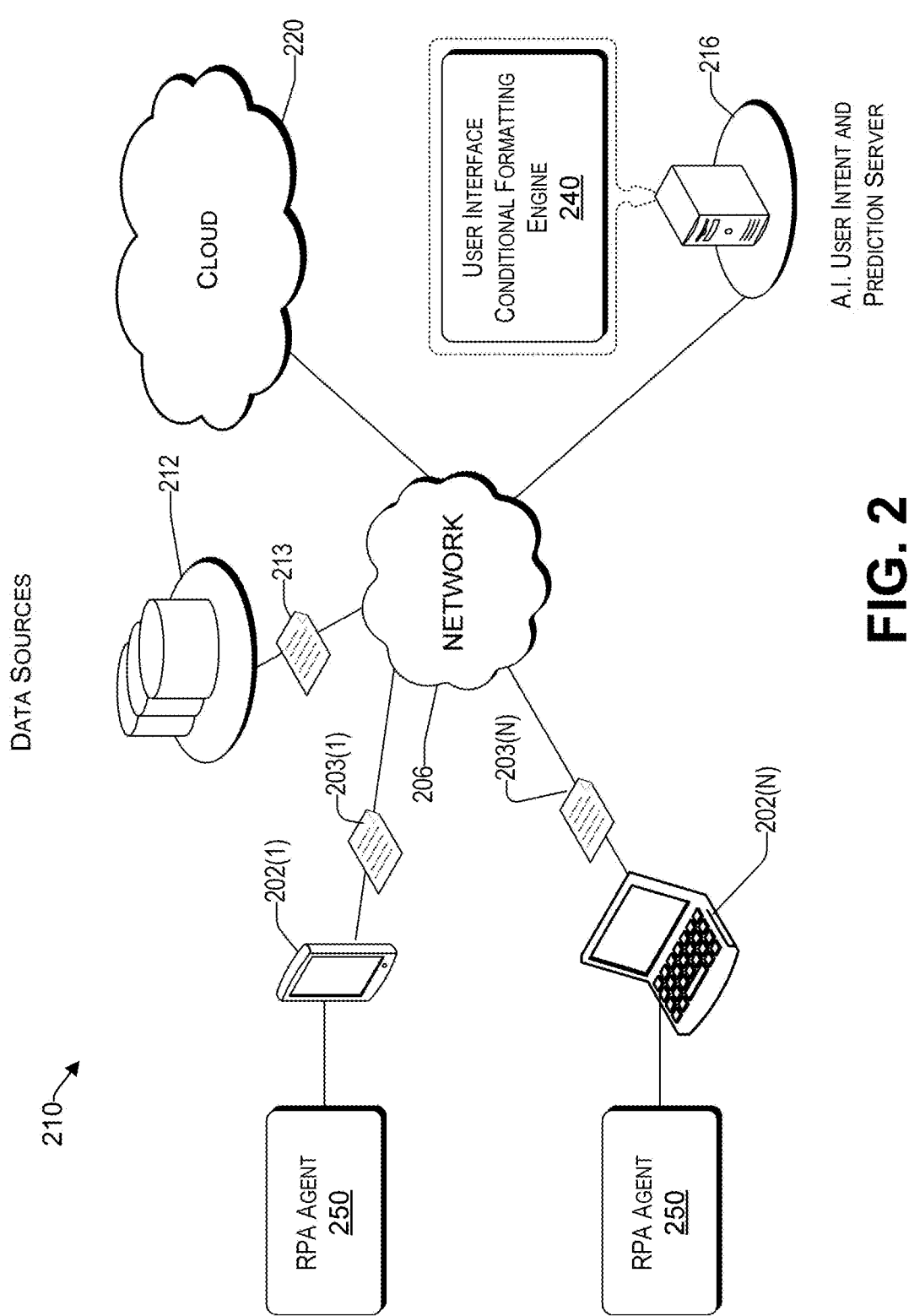
FIG. 2 is a block diagram of an architecture for automated conditional formatting of user interfaces, consistent with an illustrative embodiment.

FIG. 2 illustrates an example architecture 210 for automated conditional formatting of data segments using cognitive robotic process automation. Architecture 210 includes a network 206 that allows various computing devices 202(1) to 202(N) to communicate with each other, as well as other elements that are connected to the network 206, such as data source 212, an A.I. user intent and prediction server 216, and the cloud 220. The computing devices 202(1) to 202(N) and A.I. user intent and prediction server 216 may operate under the computing environment described above in FIG. 1. The A.I. user intent and prediction server 216 may operate the conditional formatting code 200, including the user interface conditional formatting engine 240. Embodiments may include the RPA agent 250, which will generally reside directly on computing devices 202, as either a downloaded program or as a plug-in that is added to one or more other programs such as a dashboard or other user interface displaying performance related data.

Generally, when a user opens a dashboard, the RPA agent 250 may initiate and communicate with the user interface conditional formatting engine 240 through the network 206. In some embodiments, the RPA agent 250 is partially interactive (for example, in presenting highlighted data through conditional formatting) on respective end user interfaces, and includes an API for end users to provide feedback on predicted data segments of interest and other information through a user interface. The user interface conditional formatting engine 240 may be configured to analyze activity related to engagement of data segments by a user as identified by the RPA agent 250.

The network 206 may be, without limitation, a local area network ("LAN"), a virtual private network ("VPN"), a cellular network, the Internet, or a combination thereof. For example, the network 206 may include a mobile network that is communicatively coupled to a private network, sometimes referred to as an intranet that provides various ancillary services, such as communication with various application stores, libraries, and the Internet. The network 206 allows the user interface conditional formatting engine 240, which is a software program running on A.I. user intent and prediction server 216, to communicate with the data source 212, computing devices 202(1) to 202(N), and/or the cloud 220, to provide data processing. The data source 212 may include newly discovered data identified from users' engagement with data on respective computing devices 202, and historical data related to previous engagement activity with datasets, that will be processed under one or more techniques described here. In some embodiments, a data packet 213 may be received by the user interface conditional formatting engine 240 that includes engagement activity by a user. This data packet 213 can be received by the user interface conditional formatting engine 240 by either a push operation from the data source 212 or from a pull operation of the user interface conditional formatting engine 240. In one embodiment, the data processing for the user interface conditional formatting engine 240 is performed at least in part on the cloud 220.

For purposes of later discussion, several user devices appear in the drawing, to represent some examples of the computing devices that may be the source of data being analyzed depending on the task chosen. Aspects of the symbolic sequence data (e.g., 203(1) and 203(N)) may be communicated over the network 206 with the user interface conditional formatting engine 240. Today, user devices typically take the form of desktop computers, portable handsets, smart-phones, tablet computers, personal digital assistants (PDAs), and smart watches, although they may be implemented in other form factors, including consumer, and business electronic devices. While the data source 212 and the user interface conditional formatting engine 240 are illustrated by way of example to be on different platforms, it will be understood that in various embodiments, the data source 212 and the A.I. user intent and prediction server 216 may be combined. In other embodiments, these computing platforms may be implemented by virtual computing devices in the form of virtual machines or software containers that are hosted in a cloud 220, thereby providing an elastic architecture for processing and storage.

Example Methodology

Figure 3A:
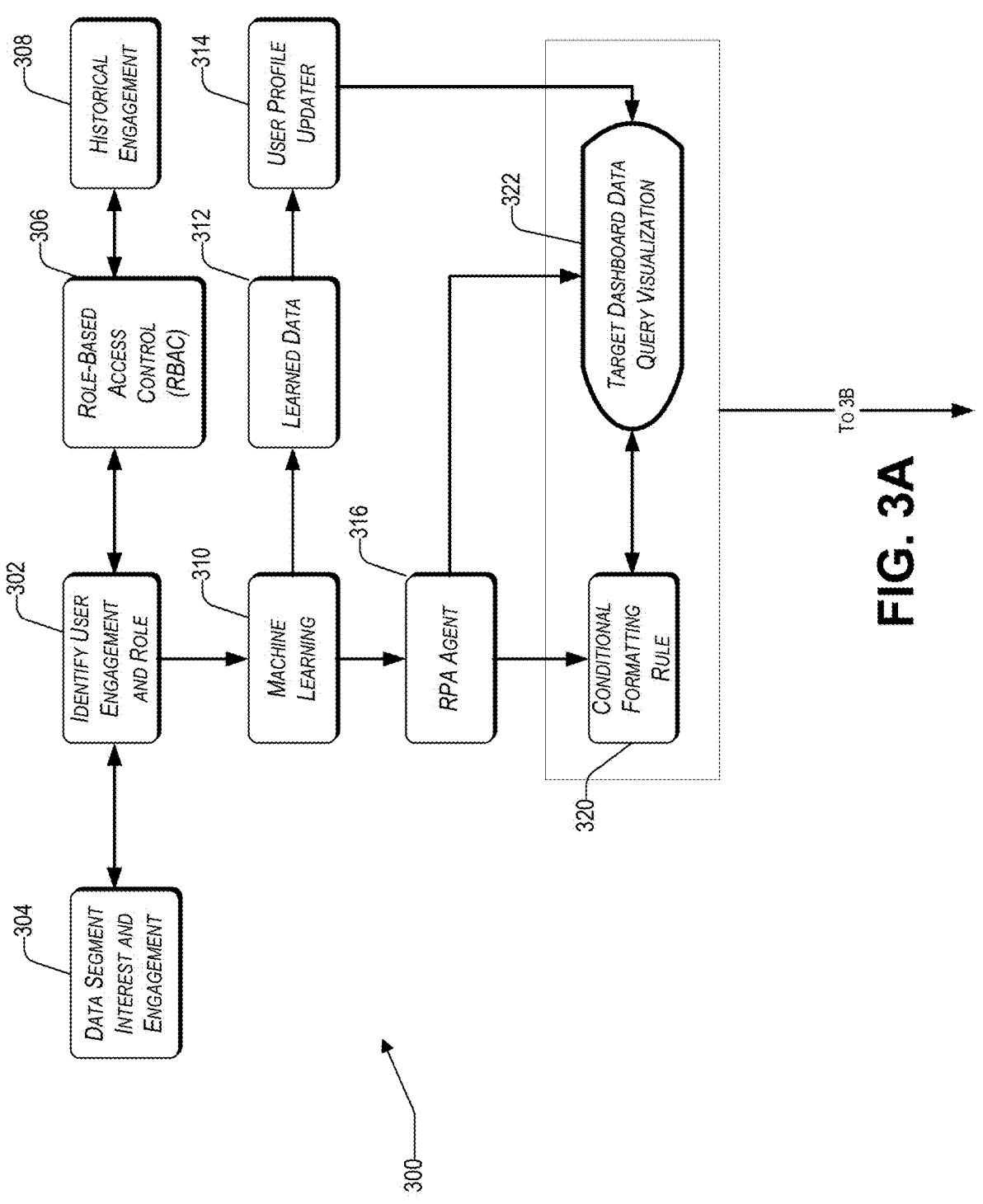
FIGS. 3A and 3B are a flowchart of a method for automated conditional formatting of user interfaces, according to an embodiment.
Figure 3B:
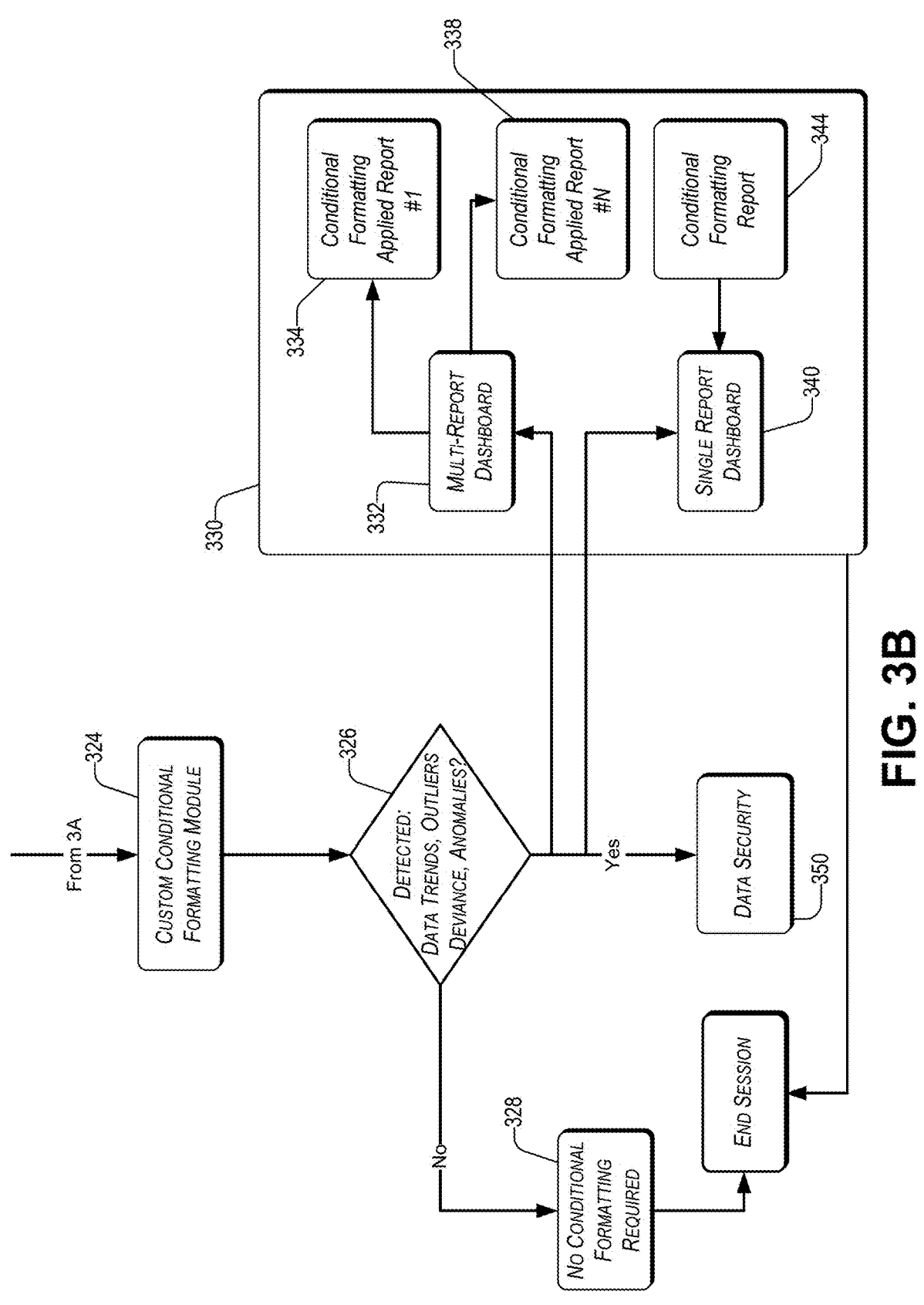

FIGS. 3A and 3B show a method 300 of automated conditional formatting of user interfaces according to an illustrative embodiment. In some embodiments, the method 300 includes an initial integration of a conditional formatting module (for example, a program such as an API that includes a combination of elements from the user interface conditional formatting engine 240 and RPA agent 250) into a software host for data presentation applications. In some embodiments, the RPA agent 250 may be a plug-in type module that runs independently and in a support role for the conditional formatting module by monitoring the activity of individual users engaged in data presentation user interfaces. The RPA agent 250 may act as an addon/plug-in to existing data presentation applications.

In operation, the RPA agent 250 may be directed to identify a user's engagement 302 with data segments of interest engaged with by the user during an engagement with a dashboard user interface (or other data presentation application interface). The identification of activity involved may include recording 304 what data segments the user selected, what kind of actions were taken or data tools applied to user selected data segments, and what kind of conditional formatting rules the user applied to any data segments. Activity captured by the RPA agent 250 may be forwarded to a machine learning module (which may be a part of the user interface conditional formatting engine 240).

In some embodiments, the machine learning module may determine from the activity captured by the RPA agent 250, what role the user may have within an organization (for example, an executive, a manager, or an analyst). For example, the machine learning module will have the foundation model of each user role in the organization. The machine learning module may keep track of the user specific interest within their role. For example, one director may only care about data related to an eastern region and another user may be an executive of a western region. The machine learning module will detect this through user learned interaction and keeps on improving the accuracy of role detection. In some embodiments, the user interface conditional formatting engine 240 may be able to retrieve the user's role from other organizational data sources. Based on the user's role, the user interface conditional formatting engine 240 may determine 306 role-based access control (RBAC) rules to apply to the data presented in a future session with a user interface. For example, because of security rules, some of the dataset available may be pared down to only data that is allowed to be view by a user according to an RBAC rule.

In some embodiments, the user interface conditional formatting engine 240 may determine the specific interests and needs of each role, which may be used in predicting data segments of interest. The user interface conditional formatting engine 240 may establish key performance indicators (KPIs) relevant to each role, which may be used in predicting data segments of interest. Some embodiments may include factoring in the geo-location of a user into user role for area segmentation of viewer. The geo-location of a user may be used to identify data segments associated within a geography of relevance to the user. For example, a regional manager may be displayed data that highlights performance within the manager's region of responsibility. Users' activity within their respective user interfaces may be recorded 308 as historical engagement data.

In some embodiments, the RPA agent may continuously monitor the user's activity to provide updated information to the machine learning module. User activity and other user-related data may be captured during a live session with a data presentation user interface (for example, a dashboard). The live session captured data and historical engagement data may be forwarded to a machine learning module to train models to predict viewer intent and interest based on their role and past behavior. The machine learning module may be trained to validate and refine models using cross-validation and performance metrics associated with the user. User geography of interest may be incorporated into models based on the role of the user (e.g., when a regional manager's interest is related to only data within the manager's region of responsibility). Using the live and historical data (represented as "Learned Data" in box 312), the machine learning module may predict 310 a set of data segments in the dashboard user interface that is predicted to be of interest to the user in a future session (for example, upon the user opening the dashboard user interface).

In some embodiments, the machine learning module may generate a user profile for each user. The user profile may include the role of the user, which dashboard or datasets the user engages with, underlying values (for example, key performance metrics) the user interacts with, threshold values or trend values the user has previously marked with conditional formatting rules, and the types of conditional formatting representing different data values. As a live session modifies any of the information in the user profile, the machine learning module may update 314 the user profile. Information from the user profile may be used in the prediction of data segments that will be of interest to the user.

The machine learning module may send 316 the predicted set of data segments to the RPA agent. The RPA agent may apply 320 conditional formatting rules to the predicted set of data segments. When the user re-engages with a dashboard user interface, the RPA agent may display the applied conditional formatting rules to the predicted set of data segments so that the data segments of interest have a visual appearance that is distinguishable from a default appearance of other data segments that are not of interest. An example is shown in FIG. 4 which will be discussed in more detail below.

Some embodiments may include application 324 of custom conditional formatting rules. In general, the user interface conditional formatting engine 240 may analyze the user's characteristics and behavior with data (which may include restrictions associated with role-based access control). The conditional formatting for each user may depend on their authentication to the platform. User authentication to the additional data insight may be controlled through backend database security measures of some embodiments. The end result would be the same as if the user manually attempted to access restricted data. Some database management applications will filter restricted data and display data that is only accessible according to a user's access rights. Some database management applications will notify users that all or part of the display is being restricted by a database security module. Machine learning insights based on the user's historical data (activity, behavior during engagement with data, etc.) may be used to create relevant formatting rules for application to predicted data segments. Any RPA-generated data may be incorporated into the rule creation process. When conditional formatting rules are established for a user, the RPA agent may apply conditional formatting rules to data visualizations in the dashboard user interface. The formatting used may be customized to each user based on the user's role, predicted intent, and determined interest in a dataset.

In some embodiments, the conditional formatting rules may be applied in real-time during a live session. For example, as the user's activity indicates some new learning by the machine learning module, the predicted set of data segments highlighted may change to show new data segments or less data segments with conditional formatting applied than when the user opened the dashboard user interface. As the machine learning refines its understanding of the user's intent, the conditional formatting rules may change in real-time to lessen the user's analysis of the data presented by automatically drawing the user's attention to data segments that more accurately present information of interest to the user. In some embodiments, during a live session as the user's intent becomes clearer, some data segments may switch from using one conditional formatting rule to another conditional formatting rule. For example, if the machine learning module predicts one data segment as representing one trend value, but upon the user selecting other data segments, the machine learning module "realizes" that the data segment actually represents another trend value based on the user's activity, the RPA agent may be directed to change the visual representation of the data segment to reflect the updated conditional formatting rule.

Some embodiments may include determining 326 whether any of the data gathered by the RPA agent shows abnormalities. For example, the user interface conditional formatting engine 240 may check to see if data exhibits unusual data trends, outliers in deviation, or anomalies. For data that is not abnormal, no conditional formatting of such data is applied 328. When abnormalities are detected, a data security function may be invoked 350. For example, displaying conditional formatting may be based on user preferences where at some stage(s) of anomaly detection, the user wants to trigger the conditional formatting. In this regard, an "abnormality" or an "anomaly" may be data that deviates from a trend or may be considered an outlier in a key performance indicator. When the anomaly is detected, the user interface conditional formatting engine 240 invokes the automated conditional formatting display function to highlight anomalies or abnormal data. The user interface conditional formatting engine 240 may run the formatted report through the backend authentication server so that only accessible data (for example, based on user access rights or credentials) is displayed. In some embodiments, the displayed (accessible) data is the only dataset that will be transformed into conditional formatting and does not require the user interface conditional formatting engine 240 to process additional (for example, inaccessible) data for view and formatting. The user may be displayed data with conditional formatting as they would in a default interaction with the dataset.

Reports may be distributed 330 to members of the organization. For single report dashboard outputs 340, the display shows 344 conditional formatting for a single session instance. In some embodiments, the user interface conditional formatting engine 240 may generate 332 multi-report dashboards where cascading conditional formatting is applied in related reports (334 and 338). The conditional formatting rules may be displayed across multiple data dimensions in a dashboard. For example, there may be three reports/queries within a single dashboard view. These reports all display different relevant dimensions of the same report displaying certain key performance indicators that can easily be compared in a view to get a better sense of the business performance. Now, based on the user preference and the machine learning of the user intent, once one of the reports (a first report) is processed to display the user's conditional formatting style, one or more of the other two reports in the dashboard view may be converted to include the same conditional formatting rules and display of features if a trend in one of the other reports is relevant as data to be highlighted for the user's directed review as highlighted data in the first report.

Example User Interface Output

FIG. 4 shows an example of a screenshot 400 incorporating automated conditional formatting in accordance with the embodiments disclosed herein. The screenshot 400 shows a spreadsheet style user interface 405. The user interface 405 includes conditional formatting of data segments that have a visual indicator surrounding cells of interest. Data segments 410 are shown in a default appearance that lacks any visual indicator. The lack of a visual indicator represents that the data segments 410 have values that should not draw the user's attention for the user's predicted intent of interest in analyzing the data. Data segments 420, 430, and 450 each represent data segments with different applied conditional formatting rules that are automatically applied by the user interface conditional formatting engine 240. Data segments 420 represent values for one level of interest (for example, a key performance indicator meeting a positive threshold value or trend). Data segments 430 represent values for a second level of interest (for example, a key performance indicator meeting a warning or secondary stage threshold value or trend). Data segments 450 represent values for a third level of interest (for example, a key performance indicator meeting a negative or failing threshold value or trend). Depending on the level of key performance indication (or other metric), the outline for the different data segments 420, 430, and 450 visually distinguishes them from each other and from the default data segments of no interest. From one session to another, the conditional formatting of different data segments 410 may change. Depending on the user, different data segments 410 may be highlighted by conditional formatting. As may be appreciated, since the dataset may have several values and the values and locations on the user interface 405 may change from session to session, the subject technology readily identifies and visually highlights the areas of interest for the user saving the user time and helping the user analyze the most relevant data segments 410 of interest.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer program product for automated conditional formatting of a user interface, the computer program product comprising a computer readable storage medium having program instructions embodied therewith, wherein the program instructions when executed by a processor cause the processor to:

receive, by a robotic process automation (RPA) agent, user activity via a dashboard user interface;

automatically determine, by the processor, data engaged by a user from data associated with the user activity;

identify a role of the user during an engagement with the dashboard user interface;

identify, by the RPA agent, one or more data segments of interest from the data engaged by the user;

forward the one or more data segments of interest and the identified role of the user to a machine learning module;

predict, by the machine learning module, an intent of the user in a future session of engaging with new data on the dashboard user interface, wherein the prediction of the intent is based on the user activity and the identified role of the user;

predict, by the machine learning module, a set of data segments in the dashboard user interface that will be of interest to the user in the future session of engaging with the new data on the dashboard user interface, wherein the prediction of the set of data segments is based on: the predicted intent of the user and a reception of a notification of an opening of the dashboard user interface;

send the predicted set of data segments to the RPA agent;

apply, by the RPA agent, conditional formatting rules to the predicted set of data segments; and display the predicted set of data segments on the dashboard user interface by using the applied conditional formatting rules.

2. The computer program product of claim 1, wherein the program instructions further cause the processor to:

continuously monitor, by the RPA agent, the user activity with the dashboard user interface;

store an updated history of the user activity with the dashboard user interface; and update, the display of the predicted set of data segments, based on identifying of a change in the user activity with the dashboard user interface from the updated history.

3. The computer program product of claim 2, wherein the program instructions further cause the processor to:

forward the updated history to the machine learning module; and update the predicted set of data segments based on the updated history.

4. The computer program product of claim 3, wherein the program instructions further cause the processor to:

generate, by the machine learning module, a user profile based on the user activity with the dashboard user interface and the identified role of the user; and update the user profile based on the updated history.

5. The computer program product of claim 1, wherein the program instructions further cause the processor to:

determine a role-based access restriction rule associated with the user; and adjust the prediction of the set of data segments to include only data segments that are available to the user based on the role-based access restriction rule.

6. The computer program product of claim 1, wherein the automated conditional formatting displays the predicted set of data segments using a visual indicator that is distinguishable from a default formatting of data segments, other than the predicted set of data segments, displayed in the dashboard user interface.

7. A computer-implemented method for automated conditional formatting of user interfaces, the computer-implemented method comprising:

receiving, by a robotic process automation (RPA) agent, user activity via a dashboard user interface;

automatically determining, by the RPA agent, data engaged by a user from data associated with the user activity;

identifying a role of the user during an engagement with the dashboard user interface;

identifying, by the RPA agent, one or more data segments predicted to be of interest based on the data engaged by the user;

forwarding the one or more data segments of interest and the identified role of the user, to a machine learning module;

predicting, by the machine learning module, an intent of the user in a future session of engaging with new data on the dashboard user interface, wherein the prediction of the intent is based on the user activity and the identified role of the user;

predicting, by the machine learning module, a set of data segments in the dashboard user interface that will be of interest to the user in the future session of engaging with the new data on the dashboard user interface, wherein the prediction of the set of data segments is based on: the predicted intent of the user and a reception of a notification of an opening of the dashboard user interface;

sending the predicted set of data segments to the RPA agent;

applying, by the RPA agent, conditional formatting rules to the predicted set of data segments; and displaying the predicted set of data segments on the dashboard user interface by using the applied conditional formatting rules.

8. The computer-implemented method of claim 7, further comprising:

continuously monitoring, by the RPA agent, the user activity with the dashboard user interface;

storing an updated history of the user activity with the dashboard user interface; and updating, the display of the predicted set of data segments, based on identifying of a change in the user activity with the dashboard user interface from the updated history.

9. The computer-implemented method of claim 8, further comprising:

forwarding the updated history to the machine learning module; and updating the predicted set of data segments based on the updated history.

10. The computer-implemented method of claim 9, further comprising:

generating, by the machine learning module, a user profile based on the user activity with the dashboard user interface and the identified role of the user; and updating the user profile based on the updated history.

11. The computer-implemented method of claim 7, further comprising:

determining a role-based access restriction rule associated with the user; and adjusting the prediction of the set of data segments to include only data segments that are available to the user based on the role-based access restriction rule.

12. The computer-implemented method of claim 7, wherein the automated conditional formatting comprises displaying the predicted set of data segments using a visual indicator that is distinguishable from a default formatting of data segments, other than the predicted set of data segments, displayed in the dashboard user interface.

13. A computing device, comprising:

a processor operating a dashboard user interface displaying data; and a memory coupled to the processor, the memory storing instructions to cause the processor to perform operations comprising:

receiving, by a robotic process automation (RPA) agent, user activity via the dashboard user interface;

automatically determining, by the processor, data engaged by a user from the user activity;

identifying a role of the user during an engagement with the dashboard user interface;

identifying, by the RPA agent, one or more data segments of interest from the data engaged by the user;

forwarding the one or more data segments of interest and the identified role of the user to a machine learning module;

predicting, by the machine learning module, an intent of the user in a future session of engaging with new data on the dashboard user interface, wherein the prediction of the intent is based on the user activity and the identified role of the user;

predicting, by the machine learning module, a set of data segments in the dashboard user interface that are identified to be of interest to the user in the future session of engaging with the new data on the dashboard user interface, wherein the prediction of the set of data segments is based on: the predicted intent of the user and a reception of a notification of an opening of the dashboard user interface;

sending the predicted set of data segments to the RPA agent;

applying, by the RPA agent, conditional formatting rules to the predicted set of data segments; and displaying the predicted set of data segments on the dashboard user interface by using the applied conditional formatting rules.

14. The computing device of claim 13, wherein the instructions further cause the processor to perform the operations comprising:

continuously monitoring, by the RPA agent, the user activity with the dashboard user interface;

storing an updated history of the user activity with the dashboard user interface; and updating, the display of the predicted set of data segments, based on identifying of a change in the user activity with the dashboard user interface from the updated history.

15. The computing device of claim 14, wherein the instructions further cause the processor to perform the operations comprising:

forwarding the updated history to the machine learning module; and updating the predicted set of data segments based on the updated history.

16. The computing device of claim 15, wherein the instructions further cause the processor to perform the operations comprising:

generating, by the machine learning module, a user profile based on the user activity with the dashboard user interface and the identified role of the user; and updating the user profile based on the updated history.

17. The computing device of claim 13, wherein the instructions further cause the processor to perform the operations comprising:

determining a role-based access restriction rule associated with the user; and adjusting the prediction of the set of data segments to include only data segments that are available to the user based on the role-based access restriction rule.

\* \* \* \* \*